Feb. 11, 1936. J. M. GWINN, JR 2,030,631
AIRCRAFT
Filed Jan. 24, 1935
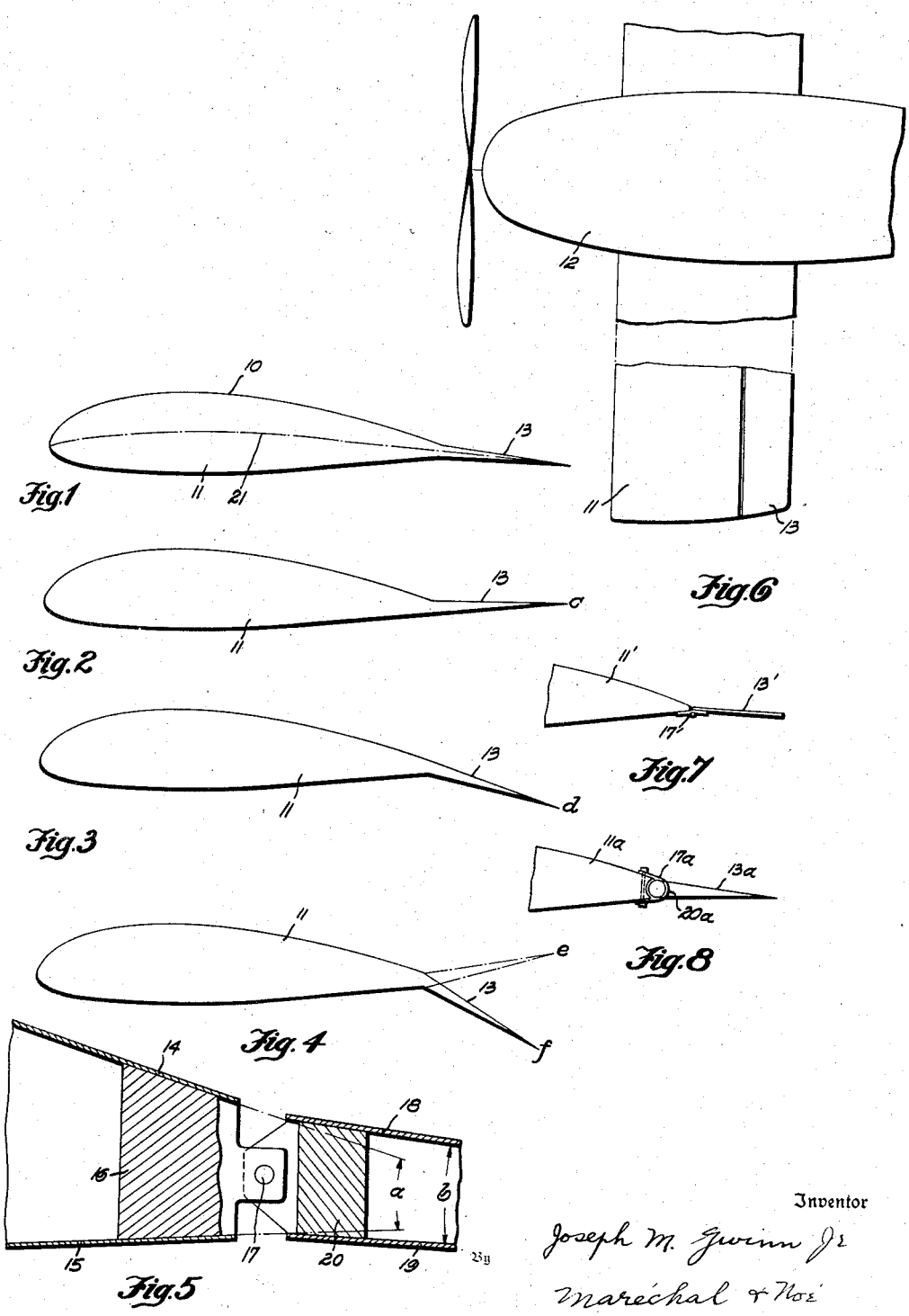
Inventor
Joseph M. Gwinn Jr
Marechal & Noé
Attorney Patented Feb. 11, 1936

2,030,631

UNITED STATES PATENT OFFICE 2,030,631

AIRCRAFT

Joseph M. Gwinn, Jr., Buffalo, N. Y.

Application January 24, 1935, Serial No. 3,306

REISSUED

3 Claims. (Cl. 244—29)

This invention relates to aircraft and more particularly to controllable aerofoil surfaces for airplanes and the like.

One object of the invention is the provision of a controllable aerofoil comprising two sections of fixed or constant contour and pivotally connected one in continuation of the other to permit controlling the effective camber of the airfoil, the upper and lower surfaces of the two sections adjacent the hinge location being so provided and arranged as to afford a comparatively low section drag throughout an effective range of camber adjustment and to afford a comparatively high section drag when the camber is adjusted above or below said effective range.

Another object of the invention is the provision of an aerofoil embodying a main fixed front section and a pivotally movable rear section, both of constant contour, the included angle between the upper and lower surfaces of the rear section just back of the hinge location being less than the included angle between the upper and lower surfaces of the front section just ahead of the hinge location so as to provide for no convex discontinuity of the aerofoil surface throughout an effective range of positions of the rear section.

Other objects and advantages of the invention will be apparent from the following description, the appended claims, and the accompanying drawing, in which,—

Fig. 1 shows a transverse section through an aerofoil embodying the present invention, the rear adjustable section being shown in its normal or neutral position;

Figs. 2, 3 and 4 are sectional views of the aerofoil surface with the rear section shown in raised, lowered and braking positions, respectively;

Fig. 5 is an enlarged detail through the aerofoil shown in Fig. 1;

Fig. 6 is a top plan view of an airplane provided with an aerofoil surface of the present invention;

Fig. 7 is a sectional view showing a modified form of flap section; and

Fig. 8 is a sectional view showing a modified form of hinge connection.

Referring more particularly to the drawing, 10 generally designates an aerofoil, such as the sustaining, controlling or tail surface of an airplane or the like. This aerofoil surface embodies a plurality of relatively movable sections pivotally connected or hinged together and providing for changes in the effective camber. As herein shown, the invention is adapted and illustrated as applied to the main sustaining surface of the airplane, the front section 11 being fixed to the airplane body or fuselage 12, while the rear section 13, which constitutes an aileron or wing flap of any desired length, is hinged adjacent its forward edge to the rear portion of the front section 11 and controlled by any suitable means by the operator while the aircraft is in flight for the regulation of the effective camber and for stabilizing and steering purposes. While the sections 11 and 13 constitute the main sustaining surface of the aircraft in the form of the invention as herein described for purposes of illustration, it will be apparent that the invention is not limited to surfaces which are horizontal or which are provided near the center of gravity of the aircraft to operate as the main sustaining surface.

The usual wing flap or wing flap type of aileron of an airplane has ordinarily been so constructed and designed that its upper surface adjacent the hinge location is substantially in smooth continuation of the curvature of the upper surface of the fixed front portion of the wing, while at the same time the lower surface of the flap or aileron is substantially in smooth continuation of the lower surface of the fixed portion of the wing. With this arrangement, as soon as the flap (or aileron) is moved downwardly from its normal position a break occurs in the convex continuity of the upper surface of the wing. As the air follows with difficulty a surface having a line of convex discontinuity extending across the direction of air flow, said convex discontinuity causes the air flow to leave the airfoil surface at said discontinuity, producing turbulent flow with a great increase in drag. With a flap this is quite a disadvantage, especially at the time of take-off from the ground, when low drag is a desirable factor. While in flight, high drag on the aileron which is down is undesired.

In accordance with the present invention, the disadvantages of the prior arrangement have been effectively overcome in a simple construction embodying a plurality of relatively movable sections each of constant or fixed contour. Since the sections are of fixed form or contour they may be made quite light in weight and of strong and simple construction. The front section 11 of the sustaining surface as herein shown constitutes a main fixed front section of suitable contour defined by the upper and lower surfaces 14 and 15 respectively, which are suitably secured in any desired manner to transversely extending supporting means 16. As will be apparent from the drawing, the front section 11 is of considerable thickness and vertical depth as compared with its overall length in the direction of movement. As shown, the thickness ratio,—that is the vertical depth divided by total length, is of the order of 20%. This figure, however, should not be considered as a limiting maximum or minimum value. But with a comparatively thick surface section an appreciable difference in angularity of the upper and lower surfaces just ahead and just behind the hinge location may be provided for even though the chordwise length of the movable section is quite long. The rear portion of the fixed section 11, as shown in Fig. 1, tapers rearwardly although at the rear of this section adjacent the aileron or wing flap hinge 17 the upper and lower surfaces 14 and 15 are usually spaced apart a substantial distance.

The rear movable section 13, which is preferably considerably shorter in chord length than the length of the section 11, as herein shown in Figs. 1 to 6 inclusive, comprises upper and lower surfaces 18 and 19 supported on transversely extending supporting means 20, the parts 16 and 20 being hinged together along the hinge axis 17 so that the section 13 can be moved or adjusted to different angles. As will be apparent from Figs. 1 and 5, the included angle $b$ between the upper and lower surfaces of the rear section 13 at or just to the rear of the hinge location is substantially less than the included angle $a$ between the upper and lower surfaces of the fixed section 11 just at or ahead of the hinge position. In its mid-position, the rear section 13 is approximately in continuation of the median line 21 of the front section, as shown in Fig. 1. In this position, there is no large break in the curvature continuity of either the upper or lower surface of the wing adjacent the hinge location and, what is also relatively important, there is no convex discontinuity in either surface of the wing so that the resistance or drag of the sections 11 and 13 is relatively small. This drag is still small even when the aerofoil section is moved angularly either upwardly or downwardly from its normal position to the positions shown in Figs. 2 or 3. The position of the section 13 represented by the letter $c$, and illustrated in Fig. 2, is one for low camber while the position indicated $d$ and shown in Fig. 3 is one for high lift, but in both of these positions and throughout the angular range between these two positions which corresponds to the usual range of effective working for control operations while in flight, the section or parasite drag is quite small.

In the position $c$ the lower surface of the entire aerofoil is gradually curved and of continuous convex form while the upper surface is without convex discontinuity, that is the exterior angle between the rear upper portion of the fixed section 11 and the upper forward part of the section 13 is not greater than 180 degrees. It will be observed from Fig. 3 that this is also true of the upper surface when the section 13 is in the low drag high lift position $d$, and in this position there is also no convex discontinuity in the lower surface. The section 13 may therefore be moved through a rather wide range of positions including the positions illustrated at $c$ and $d$ and intermediate positions without substantially changing the drag from its low initial value. When used as wing flaps, which are simultaneously moved downwardly in the same direction under the control of the operator, the drag may therefore be kept quite low while the lift is high, at the time of take-off from the ground, a condition unattainable in the usual form of wing flap construction.

Under flying conditions when the flap is used as an aileron, it may sometimes be desirable or necessary to move the section 13 higher than position $c$ to position $e$ as shown in Fig. 4 in dotted lines, where a convex discontinuity in the under surface occurs. In this position the drag is substantially increased, which increase in drag is of great value on the side of the airplane of the upwardly moved aileron. When it is desired to position the section 13 for landing purposes, it may be moved down to the position shown in full lines in Fig. 4 and as represented by the letter $f$, to provide a high lift, high drag position, thus serving by reason of the high drag to steepen the angle of glide and to shorten the length of run along the ground.

The flap or aileron 13' may, if desired, have parallel top and bottom surfaces, as shown in Fig. 7 in which the flap or aileron is constructed, for example, of a single thickness of plywood or metal, hinged to the rear part of the fixed section 11' by a hinge 17' provided on the lower surface. The hinge may be of any desirable form, the modified form of hinge shown in Fig. 8 comprising a strap type hinge 17a connecting the tube 20a at the front of the flap 13a to the rear end of the fixed section 11a.

An important advantage attained by reason of the described construction is that the angle of aileron or flap movement required in effecting the usual airplane control is comparatively small due to the fact that the lift changes much more rapidly with flap movement when no convex discontinuities are produced by the flap movement.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In an aircraft, in combination, a sustaining surface essentially comprising a main fixed section of constant contour and of substantial depth, and a movable trailing section of constant contour hinged directly to the rear portion of said fixed section and having a depth at its front portion corresponding substantially to the depth of the rear portion of said fixed section, the included angle between the upper and lower surfaces of the trailing section just back of the hinge location being substantially less than the included angle between the upper and lower surfaces of the fixed section just ahead of the hinge location, said trailing section having a mid position substantially in continuation of the median line of the fixed section, said trailing section being movable upwardly from its normal position to a raised low drag position in which its lower surface is in smooth continuation of the lower surface of the fixed section and being movable downwardly from its normal position to a lowered high camber low drag position in which its upper surface is in smooth continuation of the upper surface of the fixed section and in which the rear end of said trailing section constitutes the final surface of the aircraft for engagement with the air body through which the trailing section passes.

2. In an aircraft, a sustaining surface comprising a main fixed section of constant contour and of substantial depth at its rear portion, and a movable trailing section of constant contour hinged directly to the rear portion of said fixed section and having a substantial depth at its front portion corresponding substantially to the depth of the rear portion of said fixed section, the included angle between the upper and lower surfaces of the trailing section just back of the hinge location being substantially less than the included angle between the upper and lower surfaces of the fixed section just ahead of the hinge location, said trailing section having a mid position substantially in continuation of the median line of the fixed section, said trailing section being movable upwardly from its mid-position to a raised low drag position in which its lower surface is in smooth continuation of the lower surface of the fixed section and being movable downwardly from its mid position to a lowered high camber low drag position in which its upper surface is in smooth continuation of the upper surface of the fixed section and in which the rear end of said trailing section constitutes the final surface of the aircraft for engagement with the air body through which the trailing section passes.

3. In an aircraft, in combination, a sustaining surface comprising a main fixed section of constant contour and of substantial depth at its rear portion, said section having a thickness ratio of the order of 20%, and a movable trailing section of constant contour hinged directly to the rear portion of said fixed section and having a substantial depth at its front portion corresponding substantially to the depth of the rear portion of said fixed section, the included angle between the upper and lower surfaces of the trailing section just back of the hinge location being substantially less than the included angle between the upper and lower surfaces of the fixed section just ahead of the hinge location, said trailing section having a mid-position substantially in continuation of the median line of the fixed section, said trailing section being movable upwardly from its mid position to a raised low drag position in which its lower surface is in smooth continuation of the lower surface of the fixed section and being movable downwardly from its mid position to a lowered high camber low drag position in which its upper surface is in smooth continuation of the upper surface of the fixed section and in which the rear end of said trailing section constitutes the final surface of the aircraft for engagement with the air body through which the trailing section passes.

JOSEPH M. GWINN, Jr.